United States Patent [19]
Sammut et al.

[11] Patent Number: 5,465,209
[45] Date of Patent: Nov. 7, 1995

[54] VEHICLE LEVEL CONTROL SYSTEM

[75] Inventors: Steven P. Sammut, Beavercreek; Marc J. Georgin, Springboro; Bruce A. Heaston, West Milton; Kamal N. Majeed, Centerville, all of Ohio; James J. Kowalik, Canton, Mich.

[73] Assignee: General Motors Corporation, Detroit, Mich.

[21] Appl. No.: 257,985

[22] Filed: Jun. 10, 1994

[51] Int. Cl.⁶ ............................................. B60G 17/00
[52] U.S. Cl. ....................................................... 364/424.05
[58] Field of Search ................... 364/424.05, 424.04, 364/431.04, 431.12; 280/840, 6.1, 6.11, 6.12, 688, 707, 713, 714; 180/41, 271

[56] References Cited

U.S. PATENT DOCUMENTS

| | | | |
|---|---|---|---|
| 4,105,216 | 8/1978 | Graham et al. | 280/6 R |
| 4,168,840 | 9/1979 | Graham | 280/6 R |
| 4,310,172 | 1/1982 | Claude et al. | 280/703 |
| 4,540,188 | 9/1985 | Meloche et al. | 280/6 R |
| 4,555,120 | 11/1985 | Frait et al. | 280/6.1 |
| 4,568,096 | 2/1986 | Yew et al. | 280/6.1 |
| 4,763,222 | 8/1988 | Heaston et al. | 361/195 |
| 4,787,644 | 11/1988 | Yokote et al. | 280/707 |
| 4,829,436 | 5/1989 | Kowalik et al. | 364/424.05 |
| 4,903,209 | 2/1990 | Kaneko | 364/424.05 |
| 4,939,655 | 7/1990 | Majeed et al. | 364/424.05 |
| 4,965,878 | 10/1990 | Yamagina et al. | 364/424.05 |
| 5,014,199 | 5/1991 | Konishi et al. | 364/424.05 |
| 5,047,938 | 9/1991 | Yokote et al. | 364/424.05 |
| 5,083,454 | 1/1992 | Yopp | 73/118.1 |
| 5,130,927 | 7/1992 | Kunishima et al. | 364/424.05 |
| 5,258,913 | 11/1993 | Baldauf | 280/840 |
| 5,267,466 | 12/1993 | Morris | 280/707 |

*Primary Examiner*—Kevin J. Teska
*Assistant Examiner*—Tan Nguyen
*Attorney, Agent, or Firm*—Anthony L. Simon

[57] ABSTRACT

A method of determining the trim set value of a vehicle body leveling system comprising the steps of: receiving a trim set command; responsive to the trim set command, retrieving a sensor output from a vehicle height sensor; determining a difference value between the sensor output and a predetermined offset, wherein the offset is indicative of an effect an average sized operator would have on the vehicle height as measured by said height sensor; and programming the difference value into a memory of a level control system, wherein the programmed value is the trim set value for the level control system.

3 Claims, 9 Drawing Sheets

VEHICLE LEVEL CONTROL SYSTEM

This invention relates to a vehicle height sensing and level control system.

BACKGROUND OF THE INVENTION

Currently, vehicles are commercially available with level control systems that sense the height and/or level of the vehicle body with respect to the wheels and adjust the vehicle suspension to level the vehicle. The systems typically include at least one height sensor sensing the height of at least one of the vehicle suspensions. The height sensors may be any of a number of sensor types including digital sensors, optical sensors, resistive sensors and transformer-type sensors. For some vehicles with level control systems, it is known to program the system with target positions that the sensors output when the vehicle body obtains a desired level height state, i.e., trim set positions, in the factory during vehicle manufacture.

One known manner of programming the trim set positions involves coupling an external computer to a service connector for the leveling system while the vehicle is on a level plant floor. The external computer reads the sensor outputs of the height sensor(s) and programs these outputs into the programmable memory, such as an EEPROM, of the leveling system, and then reads back the values to verify that they are programmed-in. These programmed-in values are then used as the target values to which the level and height control system tries to level the vehicle body.

SUMMARY OF THE PRESENT INVENTION

Advantageously, this invention provides a vehicle body level and height control system for a motor vehicle that eliminates the need for external computer hook-up to set the target height values or trim set values for the level and height control system.

Advantageously, this invention provides a level control system for a motor vehicle that allows initial programming and service programming of the trim set height by a service operator without the use of special service equipment or external devices.

Advantageously, this invention achieves the herein recited advantages through a method comprising the steps of: receiving a trim set request; responsive to the trim set request, retrieving a sensor output from a vehicle body height sensor; determining a difference value between the sensor output and a predetermined offset, wherein the offset is indicative of an effect an average sized person would have on a height of a vehicle body as measured by said body height sensor; and programming the difference value into a memory of a level control system wherein the programmed value is a trim set value for the level control system.

Structurally, the apparatus of this invention comprises: a vehicle with first and second chargeable and dischargeable air suspension members on a right suspension and on a left suspension of the vehicle, respectively; a suspension height sensor mounted to a vehicle body and a vehicle wheel at one of the right and left suspensions; a compressor having a controllable motor and an exhaust valve; a pneumatic line coupling the compressor and exhaust valve to first and second valves, the first valve coupling the pneumatic line to one of the air suspensions and the second valve coupling the pneumatic line to the other air suspension; and a microprocessor controller comprising means for sensing a trim set condition; means for receiving a sensor signal from the height sensor; means for determining a difference value between the sensor signal and an offset value indicative of an effect of an average sized operator in the vehicle on the height sensor; means for storing the difference value in memory; and means for controlling the compressor, exhaust valve and first and second valves to level the vehicle to the stored difference value.

A more detailed description of this invention, along with various embodiments thereof is described herein.

DETAILED DESCRIPTION OF THE INVENTION

Figure 1:
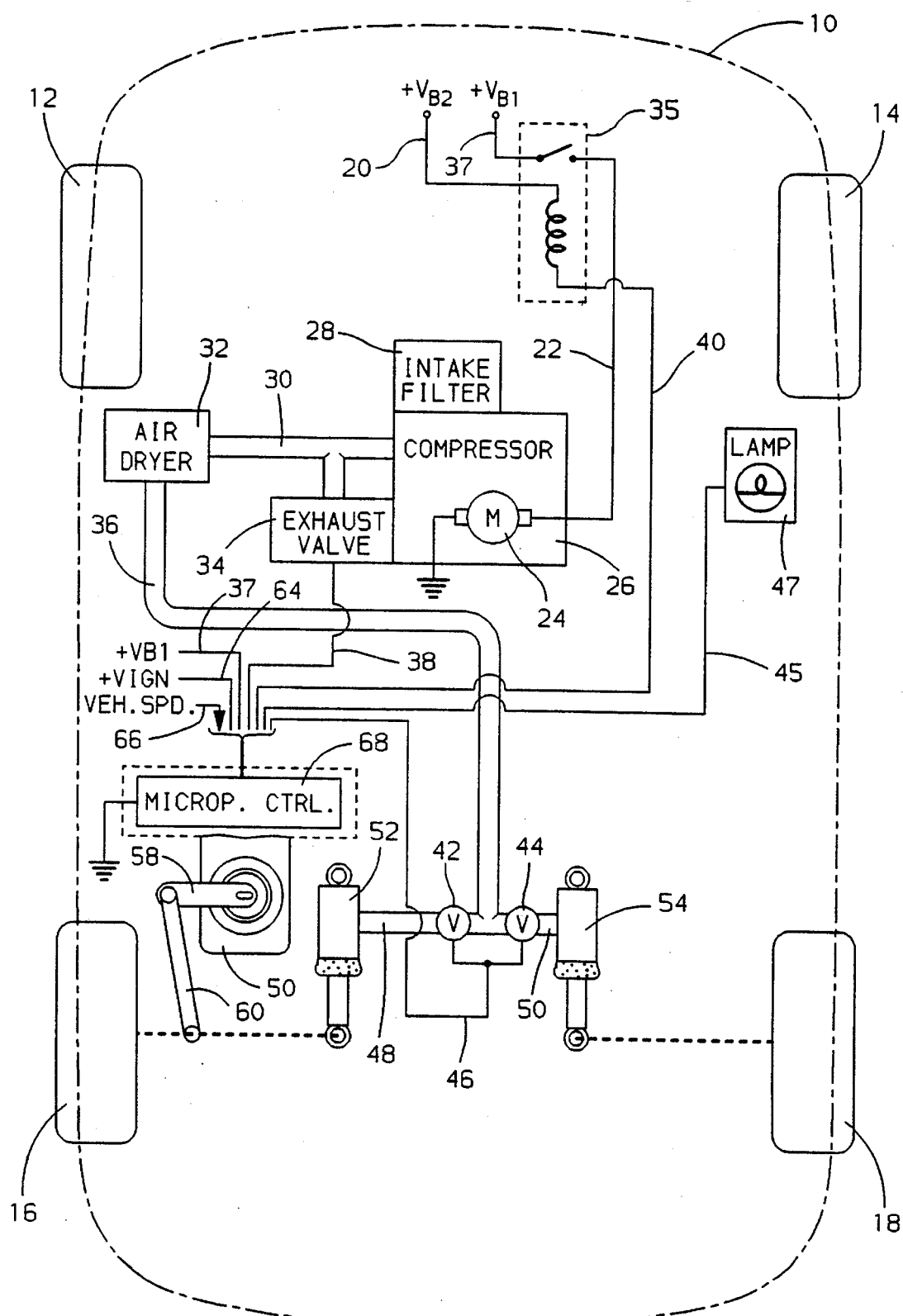
FIG. 1 is a schematic illustration of the apparatus of this invention.

Referring to FIG. 1, the vehicle body 10 comprises a suspended mass suspended by four suspensions of a known type attached to the four vehicle wheels 12, 14, 16 and 18. The two rear vehicle suspensions for the rear wheels 16 and 18 include combination shock absorber/air springs 52 and 54 of a known type, each herein referred to below as an air suspension unit. The air suspension units 52 and 54 may be of a type in which the air spring portion provides the complete spring function necessary for the suspensions shown or may be of a type in which the air spring portions assist additional springs, such as coil or other type of springs. Each air suspension unit 52 and 54 has a top mount attached in a known manner to the vehicle body 10 and a bottom mount attached in a known manner to the vehicle wheel 16 or 18. During reciprocal movement of the vehicle suspension resulting in relative movement between the wheels 16 and 18 and the vehicle body 10, the air suspension units 52 and 54 provide damping forces against the relative movement in a known manner and also act as air springs in a known manner.

At a select portion of the vehicle body 10, position sensor 50 is mounted. The location of position sensor 50 can be any suitable location for providing a desired height or level indication. Further, while the example described below includes only one such sensor 50, those skilled in the art will understand that this invention encompasses systems that use a plurality of such sensors 50. For vehicles with independent rear wheel suspension, the sensor 50 can be mounted proximal to one of the rear wheel suspensions as shown, one pan mounted to the vehicle body and the other part mounted to the vehicle wheel assembly.

In the example shown, the sensor 50 includes a rotary resistive device that provides an output impedance that varies with respect to the angular displacement of arm 58. A link 60 is pivotably connected to arm 58 and to a wheel assembly member such as a lower control arm. As the vehicle body 10 and wheel 16 are displaced with respect to each other, link 60 and arm 58 cause the rotational position of the internal resistive device of sensor 50 to vary, providing a varying impedance output that can be measured as an indication of the relative height of the vehicle body with respect to wheel 16.

A portion of a cable 62 for carrying power, sensor and control wires to sensor 50 is shown. However, since the controller is shown schematically, the lines 38, 40, 46, 18, 64 and 66 are illustrated separately. Those skilled in the art will understand that these control lines and power lines can be included within cable 62.

Included within the housing of sensor 50 is a circuit board upon which a microprocessor controller for controlling the vehicle height and level system shown is mounted. This provides advantageous packaging of a single unit 50 that provides both the height sensing and level control operation for the vehicle, eliminating the need for a separately mounted controller for the vehicle levelling system.

The air spring components of air suspensions 52 and 54 provide spring forces between the wheels 16 and 18 and the vehicle body in relation to the mount of air within the air springs. The amount of air within the air springs of air suspensions 52 and 54 is controlled by compressor 26, including motor 24, pneumatic lines 30, 36, 48 and 50, exhaust valve 34 and valves 42 and 44. To add air to the spring of air suspension units 52 and 54, a signal is provided on line 40 to relay 35 to close the internal switch of the relay 35. Relay 35 has two separately fused power lines, line 20, the power source for the coil of the relay. 35, is separately fused from the vehicle battery from line 37, which is selectively coupled by the internal switch of relay 35 to the compressor motor to provide control of the compressor motor. When the switch within relay 35 closes, power is provided to motor 24 via line 22, which starts the compressor 24. The air intake occurs through the intake filter 28 of a known type and the compressed air is provided into pneumatic line 30 through air dryer 32 to pneumatic line 36. At the same time, valves 42 and 44 are commanded open via control commands on line 46 so that the compressed air is forced through lines 48 and 50 to air suspension units 52 and 54. As the amount of air in each air suspension unit 52 and 54 increases, the static height of the portion of the vehicle body supported by air suspension units 52 and 54 increases in response.

To decrease the height of the rear of the vehicle, the command is provided through line 38 to exhaust valve 34 and a command is provided through line 46 to valves 42 and 44 so that valves 34, 42 and 44 are open, allowing air to escape from the air spring portions of air suspension units 52 and 54. The release of air from air spring portions of air suspension units 52 and 54 decreases the height of the rear of the vehicle body 10 with respect to the vehicle wheels 16 and 18.

The microprocessor controller 68 also has an output line 45 that commands a telltale lamp 47 located, for example, on the vehicle instrument panel to indicate if the vehicle level and height control system is malfunctioning.

Input signals to microprocessor controller 68 include the ignition signal on line 64 and the vehicle speed signal on line 66 to indicate whether or not the vehicle is moving. In a known manner of level control, when it senses, through the absence of speed signals on line 66, that the vehicle is not moving and the vehicle ignition is on, and in response to other known trigger parameters such as vehicle doors opening/closing, the level control system is cycled. When the level control system cycles, the amount of air in the air spring portions of air suspensions 52 and 54 is adjusted to raise or lower the rear of the vehicle body until the output of sensor 50 is equal to the trim set value predetermined according to this invention.

Figure 2:
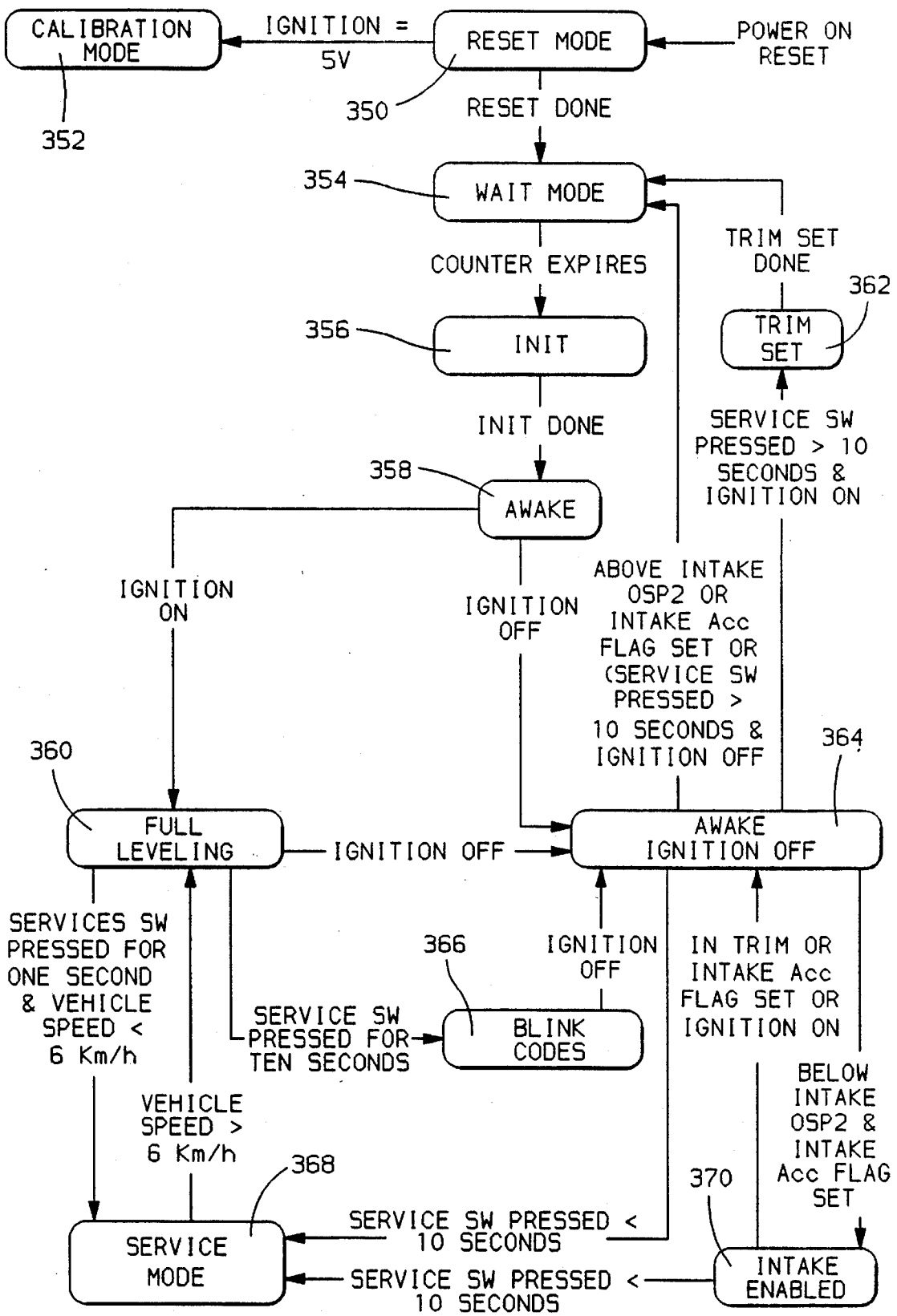
FIG. 2 illustrates a main control routine according to this invention.

Referring now to FIG. 2, the state diagram shown indicates an example state flow according to this invention of a main control of the leveling system shown in FIG. 1 as controlled by microprocessor controller 68. When the system is powered-up, it enters RESET mode at block 350, which performs the typical reset function required by a microprocessor controller. If the ignition line is set to 5 volts when the system is powered-up, the routine moves to CALIBRATION mode 352 during which programmable value and calibratable values are provided to the memory of the microprocessor 68. These programmable values may take into account differences in certain stored variables that vary from vehicle type to vehicle type, thus allowing a single system to be calibrated for various types of vehicles. CALIBRATION mode is exited by powering-down the controller.

If the RESET mode is accomplished and the ignition voltage is at the normal ignition level, the system enters WAIT mode at block 354. During WAIT MODE 354, a counter is incremented for a predetermined number of counts while the leveling control is "asleep." With timing out of the counter, which occurs every second, the system wakes up by moving to the INITIALIZE mode at block 356 where appropriate variables are reset and into the AWAKE mode at block 358. During all modes of operation, an asynchronous interrupt is triggered every 10 ms to obtain and filter the sensor information, as described below with respect to FIG. 7. During the AWAKE mode at block 358, the ignition voltage line is checked to see if the vehicle is keyed-on or keyed-off. If the vehicle is keyed-off, the system moves to the AWAKE IGNITION OFF mode at block 364. In the AWAKE IGNITION OFF mode 364, the system checks the sensor height information (the value SENSOR) and, if necessary, moves to the INTAKE ENABLE mode, block 370, to add air to the air suspension units 52, 54 to increase the height of the rear of the vehicle body.

Figure 3:
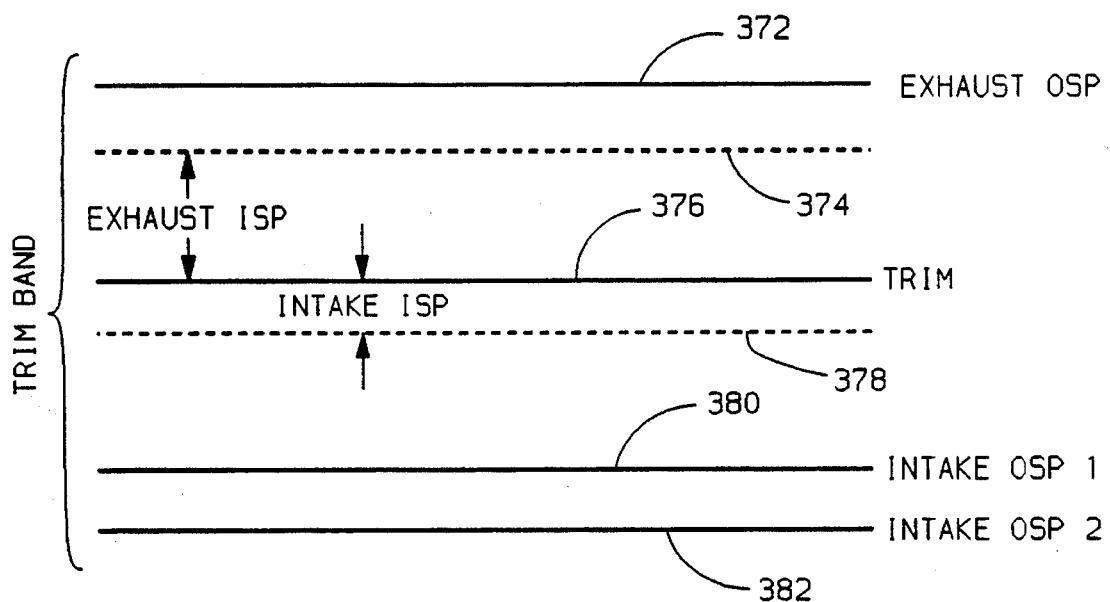
FIG. 3 illustrates a method of vehicle level control.
Figure 4A:
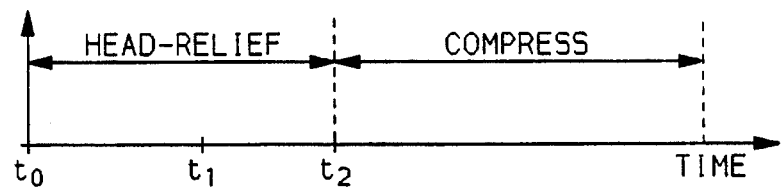
FIGS. 4a, 4b, 4c, 4d, 5a, 5b, 5c and 5d illustrate command timing during air suspension intake.
Figure 4B:
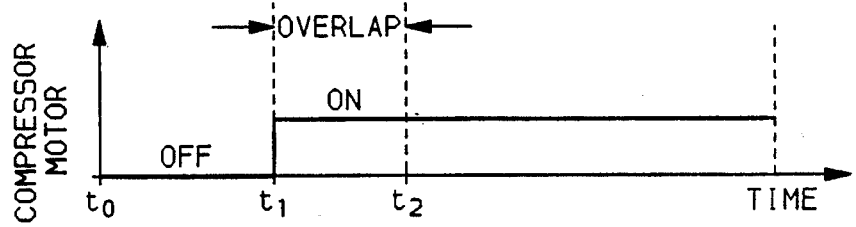
Figure 4C:
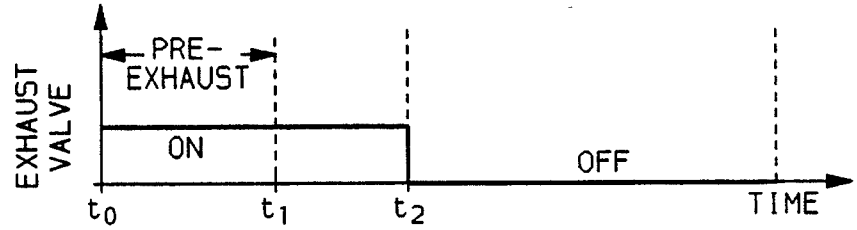
Figure 4D:
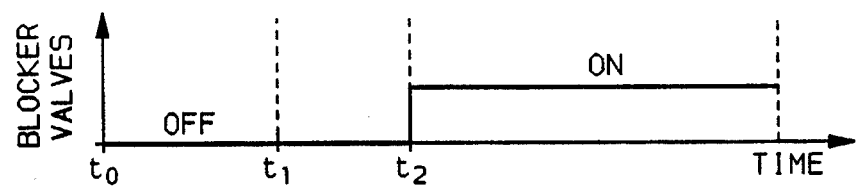
Figure 5A:
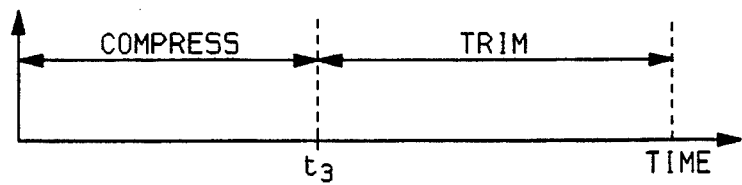
Figure 5B:
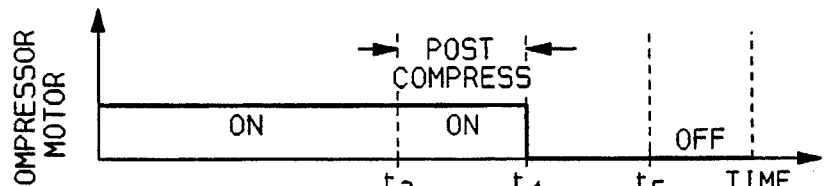
Figure 5C:
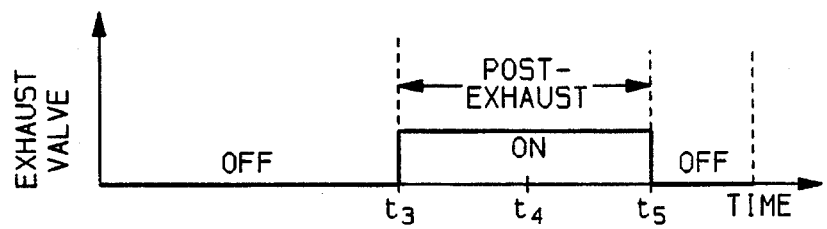
Figure 5D:
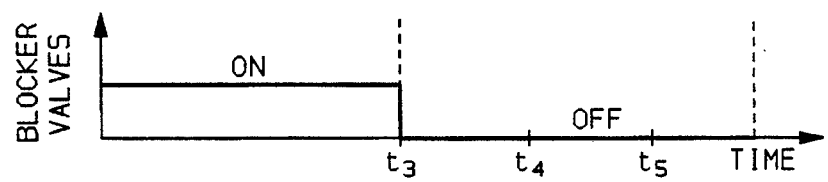

More particularly, level control according to this invention is performed generally in a known manner illustrated with respect to FIG. 3. The line 376 represents the trim line or the sensor output from body height sensor 50 when the vehicle is level according to the calibrated trim value (TRIM) stored in the microprocessor controller memory. The lines 372 and 380 define the trim band during vehicle key on operation and the line 382 defines the trim band during key off operation. The trim band is defined by the trim line 376, plus a predetermined offset and minus a predetermined offset and when the sensor output, SENSOR, is within this band, leveling is not activated. However, once the sensor output exceeds the trim band, between references 372 and 380 or falls below reference 382, the level control is activated until the trim height (reference 376) is achieved.

As described in U.S. Pat. No. 4,829,436, assigned to the assignee of this invention and incorporated herein by reference, system dynamics that cause occurrences of overshoot and settling in the pneumatic system are accounted using the references 374 and 378 shown. Overshoot is caused by the mechanical delays in the system that occur between cessation of the air exhaust or intake commands and the actual cessation of such air exhaust or intake from or to air suspension units 52 and 54. Settling is an observed phenomenon in which the height of the vehicle body appears to settle after the cessation of exhaust or intake from or to the air suspension units. During level control when vehicle body height is sensed as higher than the trim band, the exhaust operation is executed until the output of the sensor reaches level 374 shown. Once the level 374 (shown) is reached, the valves 42 and 44, (FIG. 1) are turned off closing the pneumatic line 48 and 50 from pneumatic line 36, preventing more air from escaping from the air suspension units 52 and 54. Even though the blocker valves are closed once the level 374 is reached, overshoot and settling affect the system to return the rear body height to or substantially to the trim level 376.

Similarly, when the vehicle level is below the trim band, either below line 380 when the ignition is keyed on or below line 382 when the ignition is keyed off, the intake control is cycled causing compressor 26 (FIG. 1) to add air to the air suspension units 52 and 54 to raise the rear vehicle body height. Once the output of sensor 50 obtains the level 378, the valves 42 and 44 are commanded off to isolate pneumatic lines 48 and 50 from pneumatic line 36 and compressor 26 is commanded off, preventing additional air from entering air suspension units 52 and 54. Even though line 378 is below the trim line 376, overshoot and settling will cause the resultant level to be at or substantially at the trim level 376. The offset of levels 374 and 378 from level 376 can easily be determined by simple experimentation and will vary from, vehicle type to vehicle type. While the 378 level is shown below the trim level 376, it is possible that the level 378 may be above the trim level 376 for a system with larger settling factors.

FIGS. 4a–d and 5a–d illustrate the timing of the commands during intake. At time $t_0$ when an intake sequence is first initiated, the exhaust valve 34 is turned on to pre-exhaust the pneumatic line to eliminate back pressure for compressor 26. At time $t_1$, the compressor motor is turned on and an overlap is provided between the time $t_1$ when the compressor is turned on and the time $t_1$ when the exhaust valve is closed to allow the compressor motor to start spinning without having to overcome back pressure. At time $t_2$, the exhaust valve 34 is turned off or closed and the blocker valves 42 and 44 are turned on or opened so that air compressed by compressor 26 can be provided to the air suspension units 52 and 54. When it is sensed that the level 378 is reached at time $t_3$, the blocker valves 42 and 44 are turned off while the exhaust valve 34 is turned on. At time $t_4$, the compressor motor is turned off and the exhaust valve is left open until time $t_5$ to allow ventilation of back pressure in the pneumatic system between compression motor 26 and blocker valves 42 and 44.

Figure 6A:
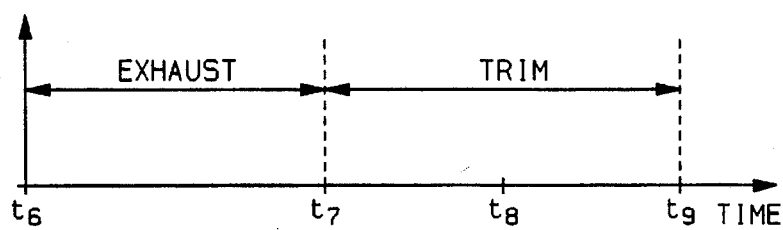
FIGS. 6a, 6b and 6c illustrate command timing during air suspension exhaust.
Figure 6C:
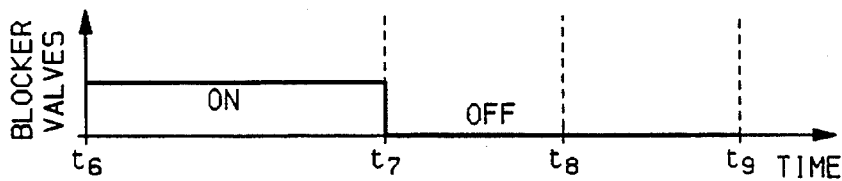
Figure 6B:
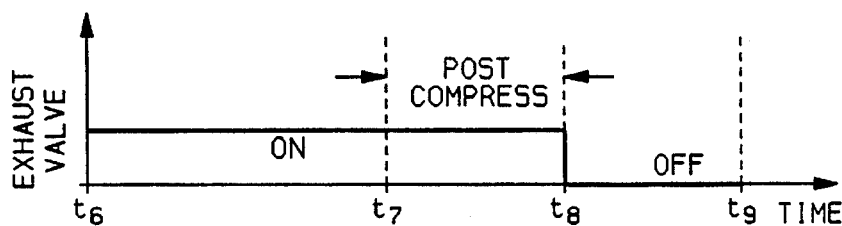

Referring to FIGS. 6a–c, the timing of the exhaust sequence is illustrated. When the output of sense 50 indicates that the height is above the level 372 shown in FIG. 3, the exhaust valve 34 and the blocker valves 42 and 44 are turned on (time $t_6$), allowing air to exhaust from air suspension units 52 and 54 out of the system through exhaust valve 34. At time $t_7$ when the level 374 is sensed by the sensor 50, the blocker valves 42 and 44 are turned off, isolating air suspension units 52 and 54 from the exhaust valve 34. Exhaust valve 34 is left open until time $t_8$ to allow ventilation of the system, at which time, exhaust valve 34 is turned off and closed.

Referring again to FIG. 2, when in the AWAKE IGNITION OFF state 364 the sensor 50 indicates that the height of the vehicle body is lower than the key off trim band level 382, the routine moves to the INTAKE ENABLE state at block 370 to perform the intake cycle to raise the vehicle body height as described above with reference to FIGS. 3, 4A and 4B. The state at block 370 is exited once the sensor reads the intake shut off level 378, the intake accumulator flag is set or the vehicle ignition is keyed on, in which case, the system returns to the state 364. The intake accumulator flag keeps track of the amount of time an intake is activated. After a predetermined time for running the compressor during intake (i.e., five minutes), the current intake activation is terminated and is not reactivated until after the occurrence of at least one of: (1) an exhaust cycling, or (2) the new ignition key-on.

If during the state 370 the service switch is pressed for less than 10 seconds, the routine moves to the SERVICE mode, state 368, which can also be entered from the state 364 and the FULL LEVELING state 360. In the SERVICE mode 368, routine system diagnostics can be performed by a service operator. If, at block 364 the service switch is depressed for greater than 10 seconds, the intake accumulator flag is set, or the sensed trim height is above the height at level 382 without cycling the intake enable state 370, the system returns to the state 354 and waits for the next wake-up. If during the state 364 the service switch is depressed for greater than 10 seconds and, during this depression, the ignition is keyed on, then the routine enters the TRIM SET state 362, described below with reference to FIG. 7, where the trim set, according to this invention, is performed. Once the state at block 362 sets the trim level (TRIM), the routine moves to the WAIT mode, state 354.

The service switch may be, for example, the set switch on the clock radio in the instrumentation panel of the vehicle. When the operator holds the switch depressed for a time period, for example, 10 seconds while keying on the ignition, according to this invention, a trim set command is achieved and the system is moved into the TRIM SET state 362.

While this method is advantageous in that it does not require additional switches and requires a function unlikely to be formed by any but a service operator knowing to do it and requiring an operator to either not be in the driver's seat or to cross arms to perform this sequence, it is unlikely that this sequence would be accidentally performed by a vehicle operator not intending to cycle the TRIM SET state. It will be recognized, however, that any other trigger or switch for triggering a service operator desired TRIM SET mode may be used as an alternative.

If at the AWAKE state 358 the ignition is on, the system moves to the FULL LEVELING state 360 where it levels the vehicle when the sensor output exceeds or falls below the trim band defined by levels 372 and 380 in FIG. 3 and performs either the necessary exhaust or intake cycling as described above. The state at 360 is contrasted to the state at block 364 in that the lower of the trim band is reference 380, which is higher than the reference 382 (used in state 364) and in that state 364, the ignition-off activation, does not allow for exhausting of air from the air suspension units 52 and 54, only intake if necessary.

In the state at block 360, if the service switch is pressed for 10 seconds, the routine moves to the CODE state 366 where a code of a known type indicating the calibration and diagnostics of the system may be signaled to a service operator. This state is exited when the ignition is keyed-off, in which case the routine moves to the state at block 364. Diagnostics for such systems are well known to those skilled in the an and need not be set forth in further detail herein.

If, during the FULL LEVELING state at block 360, the vehicle speed is less than 6 kilometers per hour and the service switch is pressed for 1 second, the routine enters the SERVICE MODE state 368, which is exited once the vehicle speed rises above 6 kilometers per hour.

Figure 7:
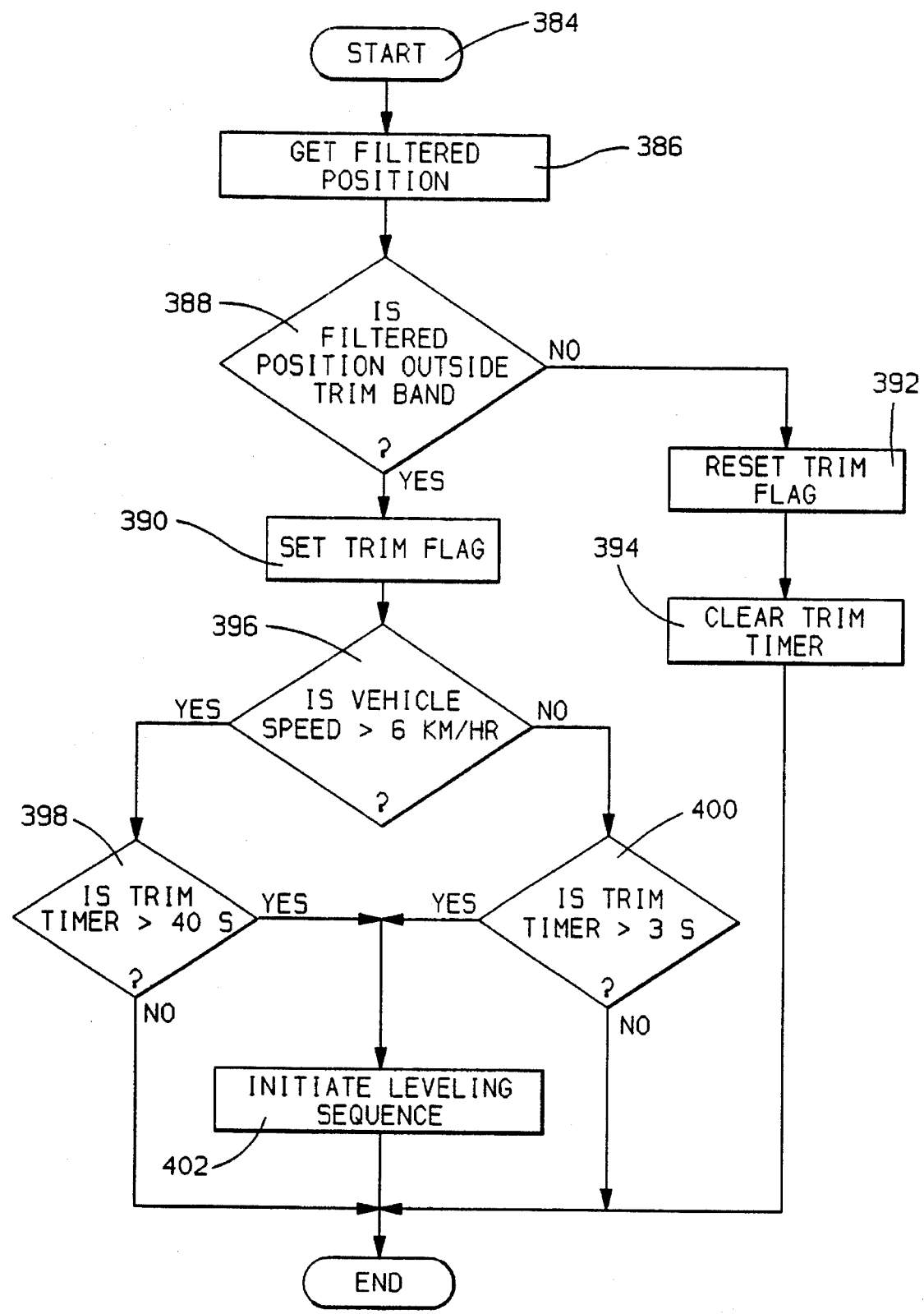
FIG. 7 illustrates a flow diagram for a level control sequence.

Referring now to FIG. 7, a main control routine for the awake mode is shown starting at block 384 and moving to block 386 where the value SENSOR is retrieved. At block 388, if the value SENSOR is outside the trim band, defined by references 372 and 380 during key-on and references 372 and 382 during key-off, then a trim flag is set at block 390 and at block 396 the vehicle speed is compared to a predetermined threshold such as 6 kilometers per hour. If the vehicle speed is not greater than the predetermined threshold, the routine moves to block 400 where a value TIMER is compared to a first timer threshold, for example, 3 seconds. If the value TIMER is not greater than the threshold, then a routine is exited at block 404. If the timer is greater than the threshold, then the leveling sequence as described above with references to FIGS. 3, 4a–d, 5a–d and 6 is executed at block 402. If at block 396 the vehicle speed is greater than the predetermined threshold, the routine moves to block 392 where the value TIMER is compared to a second timer threshold, for example, 40 seconds. If TIMER is not greater than this threshold, then the routine is exited at block 404. If TIMER is greater than this threshold, the routine moves to block 402 where the leveling sequence is executed.

The trim timer is incremented separately by a simple loop that, once per second, increments the trim timer if the trim flag is set. At block 388, if the signal SENSOR is not outside the trim band, then block 392 resets the trim flag and block 394 clears the value TIMER. The value TIMER requires that the vehicle must be continuously outside the trim band for a predetermined time period of 3 or 40 seconds, depending upon whether block 398 or 400 is controlling, before a leveling sequence is allowed.

Figure 8:
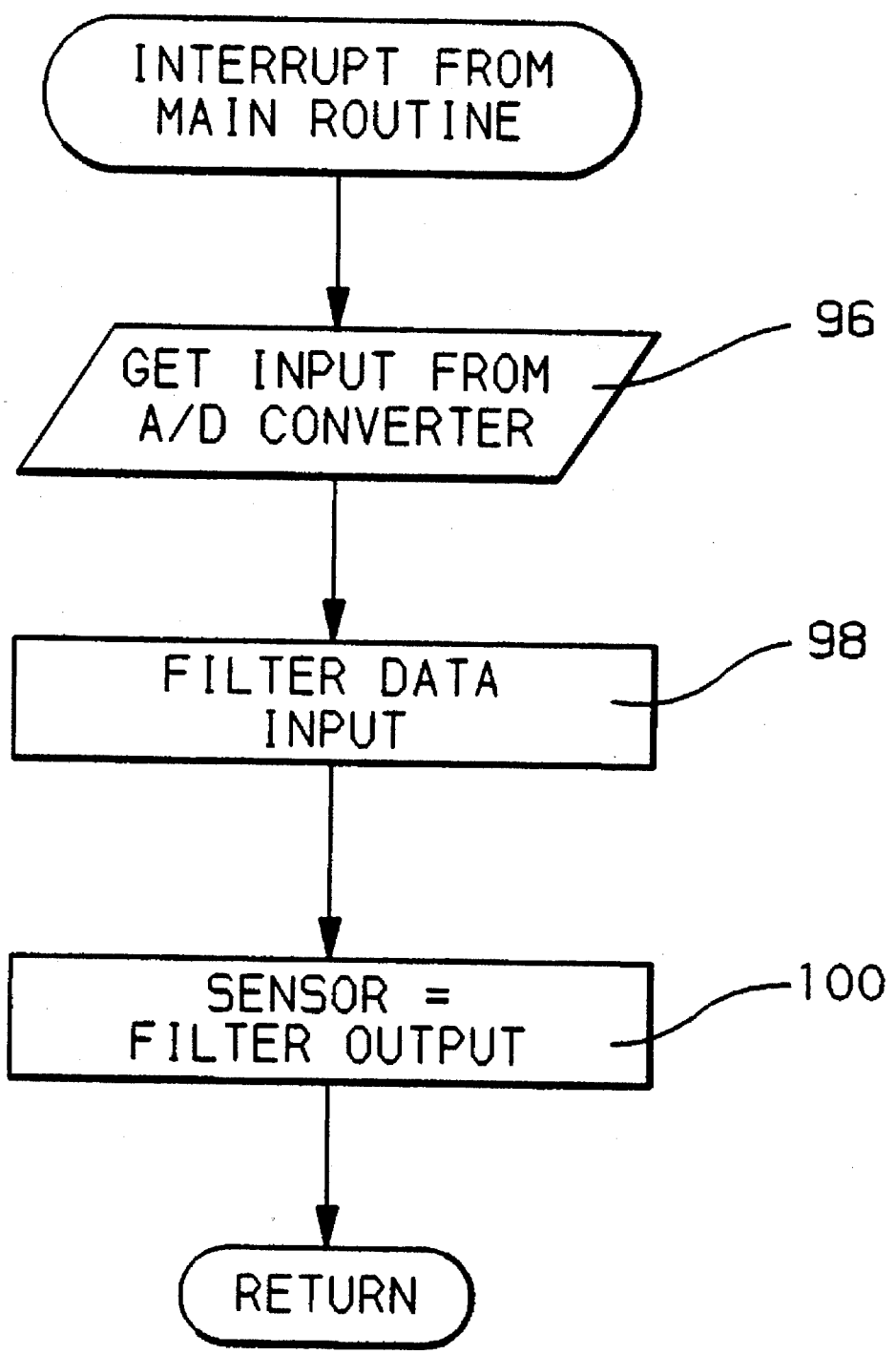
FIG. 8 illustrates a flow diagram for obtaining vehicle height data.

Referring now to FIG. 8, the interrupt routine for determining the value SENSOR is shown and starts at block 96 where it obtains from the A/D converter of the microprocessor the analog input from the rotary resistive device of sensor 50. The digitized value from the A/D converter is then digitally filtered by a filter routine at block 98, which, for example, applies a one pole low pass filter to the digital input. An example one pole low pass filter transfer function has the form $H(z)=c/(1-(1-c)z^{-1})$. The results of the filter at block 98 is then set at block 100 as the value SENSOR used in the trim set routine described below and used in the leveling control described above.

Figure 9:
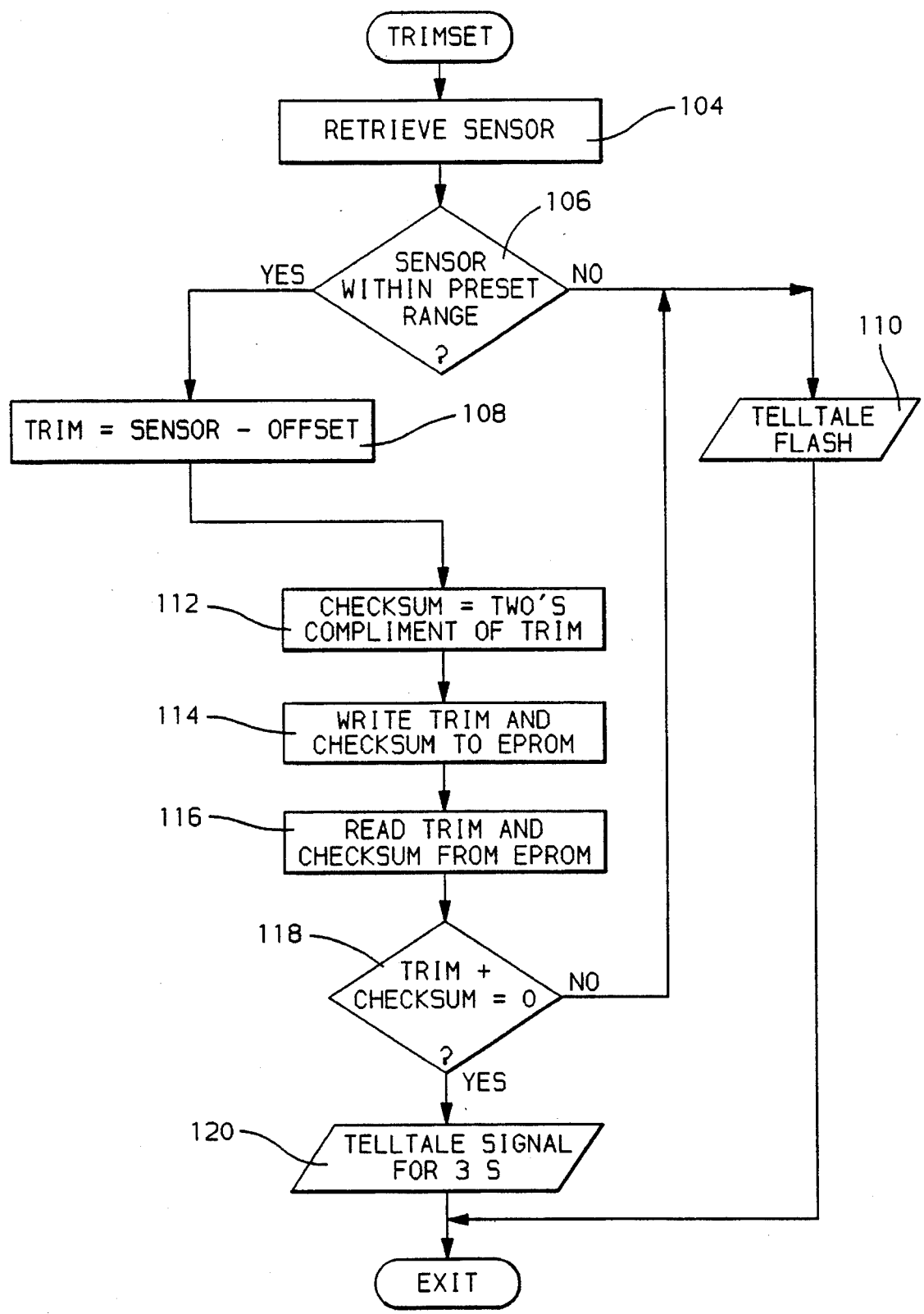
FIG. 9 illustrates a flow routine according to this invention.

Referring now to FIG. 9, the trim set routine according to this invention starts at block 104 where it retrieves the value SENSOR determined by the interrupt routine. The routine then moves to block 106, where it compares the sensor with a predetermined range defined by maximum and minimum possible sensor output values. If the value SENSOR is not within this range at block 106, it is assumed that there is an error in the system and the routine moves to block 110 where it commands the telltale lamp to be illuminated in a flashing manner to warn an operator of a possible error in the system. If the value SENSOR is within the predetermined range at block 106, the routine continues to block 108 where it subtracts from a value SENSOR a predetermined value OFFSET and sets the variable TRIM equal to the difference result. The value OFFSET is determined by the effect of an average size service operator and a predetermined amount of fuel in the fuel tank, i.e., the amount of fuel during vehicle manufacture, on the height of the vehicle body as sensed by sensor 50. That is, since the trim set mode is entered with a person in the vehicle, the vehicle body height relative to the wheels and therefore as sensed by sensor 50 is affected. However, according to this invention, this effect is offset by the value OFFSET which is equal to the average value that an operator will likely cause in the change of output of sensor 50 as that operator gets into the vehicle. The value OFFSET can be easily determined by measuring sample values of the height sensor with the vehicle empty and on a level surface and then measuring sample values of the height sensor with one operator in the vehicle, which is the position of the vehicle during performance of the trim set function. The level of fuel in the tank can be set to the in-plant fill level. The differences between the two measurements can be averaged if more than one such sample is taken and the result of the single sample or the average result for multiple samples is used as the value OFFSET. Preferably an operator of average weight is used.

At block 112, 114, 116 and 118 the routine uses a self-check to check the accuracy of the programming of the EEPROM. At block 112, a value CHECKSUM is determined as the two's complement of TRIM, which is the inversion of the binary value of TRIM plus 1. At block 114, the values TRIM and CHECKSUM are written to EEPROM and then, at block 116, are read back from EEPROM. Block 118 compares the sum of the read back values to zero and, if the read back values are summed and equal 0, then it is affirmed that the values TRIM and CHECKSUM were successfully written into the EEPROM memory.

At block 120 a command is output to command a telltale to illuminate for a short time, for example, for 3 seconds, to indicate to the service operator or calibrating technician that the calibration of the trim value (reference 376, FIG. 3) has successfully taken place. The trim set routine is then exited.

EXAMPLE

Figure 10A:
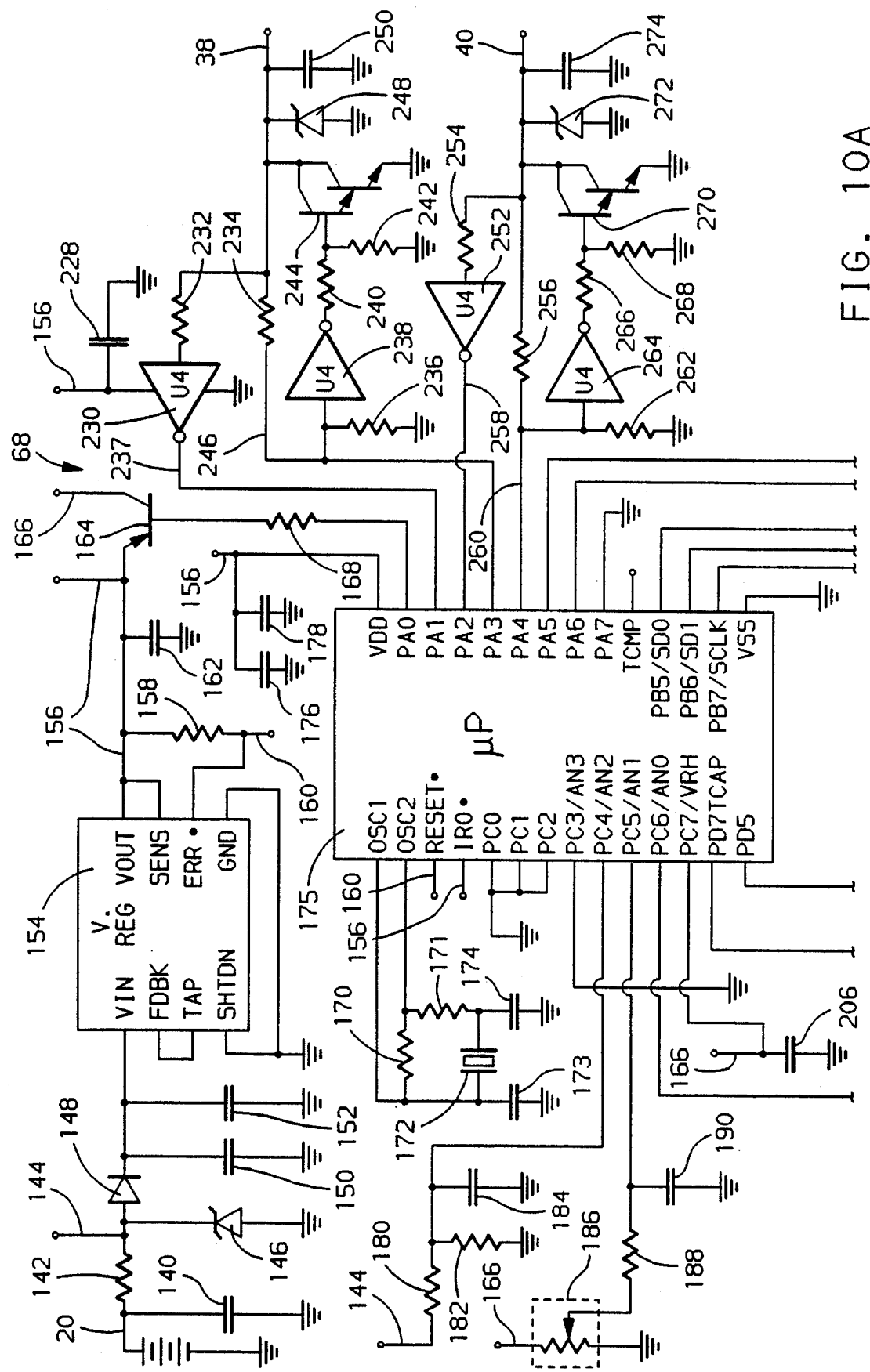
FIGS. 10a and 10b illustrate, schematically, a microprocessor controller and sensor circuit according to this invention.
Figure 10B:
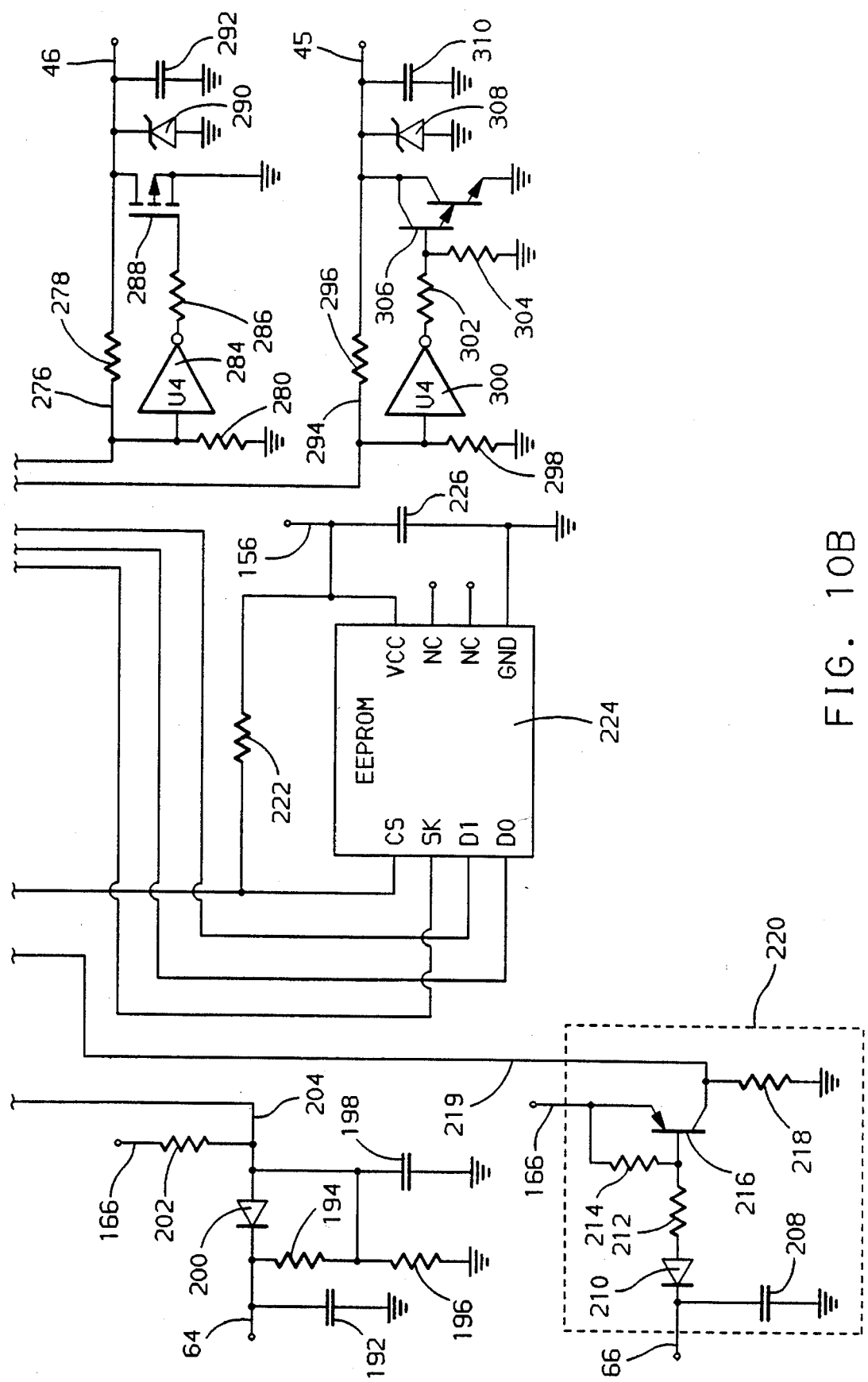

Referring now to FIGS. 10a–b, an example implementation of a microprocessor controller for use with this invention is set forth. The controller includes microprocessor 175 which is a Motorola XC68HCO5 P9CDW. The microprocessor 175 shown includes 4 analog to digital inputs; AN 0, AN 1, AN 2 and AN 3. The input AN 3 is grounded as shown. The input AN 2 is coupled to the line B+ (reference 144) via a resistor divider comprising resistors 180 and 182. Capacitor 184 provides suppression of high frequency transients. Analog-to-digital converter AN 1 is coupled to the rotary resistive device 186 that provides the position sensing output signal for the sensor 50. The rotary resistive device is illustrated schematically as reference 186 and is coupled between the regulated 5 volt reference 166 and ground. Rotary resistive device 186 has a center terminal whose position along the resistive path of the rotary resistive device varies in relation to the relative position of the wheel 16 and body 10 (FIG. 1). The output from rotary resistive device 186 is coupled to input AN 1 through resistor 188 and capacitor 190, which provides high frequency noise suppression.

The other analog input for the internal A/D converter AN 0 is coupled to the vehicle ignition line 64, which goes high when the ignition is keyed on. When the vehicle ignition is keyed on, the ignition line 64 pulls line 204 high via the resistor divider comprising resistors 194 and 196. Capacitors 192 and 198 are for high frequency noise suppression. As an option, resistor 202 and diode 200 may be implemented so that resistor 202 is coupled between line 204 and 166 to act as a pull-up bias on line 204. Pin 15 of microprocessor 175 is coupled to the 5 volt reference line 166, as shown, and capacitor 206 provides high frequency noise suppression. The vehicle speed signal comes in the form of pulses on line 66 from a vehicle speed sensor of a known type. The signal is inverted and converted to a 0–5 volt signal on line 219 by the circuit 220 comprising transistor 216, resistors 212, 214 and 218, diode 210 and capacitor 208.

When the vehicle speed signal pulse is low, current flows from the base of transistor 216 through resistor 212 and diode 210 to capacitor 208, turning on transistor 216, providing a high pulse of 5 volts minus one transistor drop on line 219. When the vehicle speed signal pulse on line 66 goes high, diode 210 blocks the current from flowing to the base of transistor 216 and resistor 214 pulls off the base of transistor 216, turning off transistor 216, allowing resistor 218 to pull line 219 low. The advantages of this circuit structure allow universal coupling from a speed sensor at an unregulated voltage level which may be 0–12 volts, 0–8 volts, or any voltage range, to a microprocessor by converting that signal through the circuitry shown to a 0–5 volt signal.

The microprocessor oscillator is controlled by the circuit comprising resistors 170 and 171, tuning crystal 172, for example set at 500 kHz, and capacitors 173 and 174. The positive voltage supply line VDD is connected to the 5 volt regulated supply line 156 and includes high frequency signal suppression capacitors 176 and 178. Voltage regulation is provided by the circuit including regulated voltage IC (LP2951C available National Semiconductor™) shown.

The battery voltage line 20 is connected via capacitor 140 and resistor 142 to line 144 which is clamped by zener diode 146 to a voltage of 27 volts to safeguard against voltage spikes. Diode 148 couples line 144 to the input of voltage regulator 154 and capacitors 150 and 152 connected between line 144 and ground provide high frequency noise suppression. The regulated output of IC 154 is a 5 volt regulated signal on line 156. Resistor 158 couples line 156 to the reset line 160, as shown. The output line 156 also includes noise suppression capacitor 162, coupled to ground as shown. Transistor 164 acts as a switch that allows microprocessor 175 to turn on and off the 5 volt reference on line 166 via resistor 168 coupled to the base of transistor 164. When transistor 164 is controlled on by microprocessor 175, a 5 volt reference minus one transistor drop is provided on line 166.

An advantage provided by the microprocessor controller shown is that lines 38 and 40 both are capable of serving two functions. The first function is a data-in line function for calibrating microprocessor 175. The second function is a data-out line function for purposes of controlling the exhaust valve 134 and compressor relay 16. The third function of each line 38 and 40 is a discrete signal input line for the purpose of system diagnostics, i.e., detecting short-to-ground, short-to-battery, and open circuit faults. Each of these functions will be explained. Line 45 is the data out line for purposes of feedback during calibration of microprocessor 175.

Line 38 is coupled by resistor 234 to line 246 which is coupled to the interface pin PA-3 of microprocessor 175. Analog data on line 38 is coupled via resistor 234 to line 246 where it is received by a discrete input of microprocessor 175. Resistors 234 and 236 act as a resistor divider for the input signals, ensuring that the input pin of the microprocessor 175 does not see too high of a voltage level. Digital data on line 38 is coupled via resistor 232 to inverter 230 which is coupled between the 5 volt regulated supply line 156 and ground, as shown, including capacitor 228. Inverter 230 provides data input on line 237 to the PA-1 interface pin of microprocessor 175. Analog or digital data output from microprocessor 175 can be provided by pin PA-3 to line 246, which is biased normally to ground by resistor 236. The data-out is provided to the input of inverter 238 and, via the resistor divider comprising resistors 240 and 242, to the Darlington pair transistors 244 to drive the data output on line 38. Line 38 can be so driven as a data output and also has enough pull-down via transistors 244 to control a load, such as exhaust valve 34 (FIG. 1). Line 38 is clamped to a maximum voltage level by zener diode 248 and is provided with high frequency suppression by capacitor 250.

Line 40 is coupled to the PA-2, PA-4 pins of microprocessor 175 in a similar manner using resistor 254 and inverter 252 coupling data to line 258, resistor 256 coupling analog information to line 260 and resistor 262, 266 and 268, inverter 264 and transistor pair 270 coupling data from line 260 to line 40. Zener diode 272 and capacitor 274 clamp line 40 and provide high frequency suppression. The PA-5 pin of microprocessor 175 is coupled to line 276 which is coupled via resistor 278 to the blocking valve control line 46 to receive data input. Data output on line 276 is coupled to inverter 284 and from the output thereof via resistor 286 to transistor 288, which drives line 46 for control of the blocking valves 42 and 44. Resistor 280 normally biases line 276 to ground. Zener diode 290 provides a clamping of line 246 and capacitor 292 provides high frequency noise suppression.

In a similar circuit, the PA-6 pin of microprocessor 175 is connected to line 294, which is coupled to line 45 via resistor 296 to receive data input. Resistors 296 and 298 together act as a resistor divider for input signals on line 45. Inverter 300 receives data out from pin PA-6 on line 294, inverts that data and couples the data via resistor divider comprising resistors 302 and 304 to transistor 306 to drive line 45 to provide either a data output or an analog output function. Zener diode 308 clamps line 45 and capacitor 310 provides high frequency noise suppression. Line 45 is coupled to a telltale lamp and is used to drive the lamp.

The circuit comprising resistor 222, capacitor 226 and memory IC 224 (NM93C06, available from National Semiconductor™) provides the EEPROM. While an external EEPROM is shown, a microprocessor 175 with an internal EEPROM can be used as a suitable alternative.

The above description of a leveling system according to this invention provides several advantages and features including the automatic trim set that eliminates the need for external equipment, such as an external vehicle leveler and/or an external programming computer, while accounting for the presence of a service operator in the vehicle. Also, a control system is provided with an advantageous package design that includes the rotary resistive device and the microprocessor controller in the same package that generally comprises the sensor and controller housing. Further, the number of connections necessary to program microprocessor 75, control the system and monitor signal lines is limited to eight through the use of the circuit set-up, according to this invention that provides up to three functions on the single signal line: including data input, analog input and data output.

The above-described implementation to this invention are example implementations. Those skilled in the art will recognize that the example microprocessor implementation shown in FIGS. 10a–b is an example implementation and that any suitable microprocessor-based controller capable of performing suitable leveling control for use with this invention is an equivalent to the example shown in FIGS. 10a–b. Moreover, various other improvements and modifications to this invention may occur to those skilled in the art and such improvements and modifications will fall within the scope of this invention as set forth below.

The embodiments in which an exclusive property or privilege is claimed are defined as follows:

1. In a combination of a vehicle body and a level control system for the vehicle body, a method of determining a trim set value of the level control system, comprising the steps of:

receiving, from a service switch, a trim set request for signalling a trim set function;

responsive to the trim set request, retrieving a sensor output detected from a vehicle body height sensor;

determining a difference value between the sensor output and a predetermined offset, wherein the predetermined offset is indicative of an effect that an average sized operator has on a height of the vehicle body as measured by said body height sensor; and storing the difference value into a memory of the level control system, wherein the stored value is the trim set value for the level control system, wherein, during vehicle operation, the level control system performs the steps of:

determining at least one control command responsive to the stored difference value and the vehicle body height sensor; and controlling the level control system responsive to the control command.

2. A combination of a vehicle and a level control system comprising:

the vehicle with first and second chargeable and dischargeable air suspension members on a right suspension and on a left suspension of the vehicle, respectively;

a suspension height sensor mounted to a vehicle body and a vehicle wheel at one of the right and left suspensions;

a compressor having a controllable motor and an exhaust valve;

a pneumatic line coupling the compressor to first and second valves, the first valve coupling the pneumatic line to one of the air suspensions and the second valve coupling the pneumatic line to the other of the air suspensions;

a microprocessor controller comprising (a) means for detecting a trim set request from a service switch, wherein the trim set request signals a trim set function, (b) means, responsive to the trim set request, for receiving a sensor signal from the height sensor, (c) means, responsive to the trim set request and the sensor signal, for determining a difference value between the sensor signal and a predetermined offset value indicative of an effect, on the height sensor, of an average sized operator in the vehicle, (d) means for storing the difference value in memory, (e) means, responsive to the height sensor and the stored difference value, for determining a set of control commands, and (f) means for outputting the control commands to the compressor, the first and second valves and the exhaust valve to level the vehicle to the stored difference value.

3. The apparatus in claim 2 wherein the microprocessor controller includes at least one multipurpose data line, wherein the multipurpose data line is coupled to a first input/output port of the microprocessor and comprises means for inputting discrete data to the microprocessor, wherein the multipurpose data line is coupled to a second input/output port of the microprocessor and comprises means for inputting digital data to the microprocessor and means for outputting discrete data from the microprocessor.

* * * * *